United States Patent
Hawkinson et al.

(10) Patent No.: US 7,121,589 B2
(45) Date of Patent: Oct. 17, 2006

(54) TANK FITTING AND METHOD OF USE

(75) Inventors: James R. Hawkinson, Maplegrove, MN (US); Jerome T. Paulson, Orono, MN (US)

(73) Assignee: Norwesco, Inc., St. Bonifacius, MN (US)

( * ) Notice: Subject to any disclaimer, the term of this patent is extended or adjusted under 35 U.S.C. 154(b) by 0 days.

(21) Appl. No.: 10/670,045

(22) Filed: Sep. 24, 2003

(65) Prior Publication Data
US 2005/0062283 A1   Mar. 24, 2005

(51) Int. Cl.
*F16L 27/00* (2006.01)

(52) U.S. Cl. .................................... 285/139.2; 285/208

(58) Field of Classification Search .. 285/139.1–139.3, 285/192, 914, FOR. 143, 208, 330, 380
See application file for complete search history.

(56) References Cited

U.S. PATENT DOCUMENTS

| | | | |
|---|---|---|---|
| 2,554,622 A | * | 5/1951 | Jones .......................... 285/379 |
| 4,492,392 A | | 1/1985 | Woods |
| 4,900,068 A | | 2/1990 | Law |
| 5,286,040 A | | 2/1994 | Gavin |
| 5,295,760 A | * | 3/1994 | Rowe ........................... 405/52 |
| 5,538,035 A | | 7/1996 | Gavin |
| 5,655,564 A | | 8/1997 | Gavin |
| 5,967,567 A | | 10/1999 | Nordstrom |
| 5,971,444 A | * | 10/1999 | Hawkins .................. 285/139.2 |
| 6,086,117 A | | 7/2000 | Youngs |
| 6,145,891 A | | 11/2000 | Youngs |
| 6,149,164 A | | 11/2000 | Kreutz |
| 6,173,997 B1 | | 1/2001 | Nordstrom |
| 6,340,181 B1 | | 1/2002 | Amatsutsu |

OTHER PUBLICATIONS

NORWESCO, Inc. "Valves & Couplers", Copyright 2002 NORWESCO, Inc., VC20M1202, pp. 1-14.

* cited by examiner

*Primary Examiner*—Aaron Dunwoody
(74) *Attorney, Agent, or Firm*—Leffert Jay & Polglaze, P.A.

(57) ABSTRACT

Tank fittings are provided. A tank fitting has a coupling. The coupling includes a flange disposed between a first end and a second end of the coupling. External threads are disposed between the flange and the first end. A gasket is disposed on the coupling between the flange and the first end of the coupling so as to abut the flange. The tank fitting also includes a nut that is threadably attachable to the external threads of the coupling.

3 Claims, 5 Drawing Sheets

US 7,121,589 B2
// 1

TANK FITTING AND METHOD OF USE

TECHNICAL FIELD OF THE INVENTION

The present invention relates generally to fittings and in particular the present invention relates to tank fittings.

BACKGROUND OF THE INVENTION

Adaptors are often used to connect piping within tanks, such as septic tanks, to external piping. For some septic-tank applications, an adaptor is used to connect piping within the septic tank, such as an internal baffle, e.g., a sanitary-tee fitting, to external piping. One method for connecting a sanitary-tee fitting to an external pipe involves disposing a flexible grommet in a hole in septic tank and pressing a pipe through the grommet so that the grommet seals around the pipe. The pipe is then connected to the external pipe and the sanitary-tee fitting. One problem with this configuration is that the pipe is not held secure within the grommet so that shifting earth or the like can damage the grommet and/or break the seal between the pipe and grommet, leading to leaks of septic tank contents.

Another method for connecting a sanitary-tee fitting to an external pipe involves a sanitary-tee fitting having a flange and a pipe stub extending from the flange. A gasket is disposed around a hole in the tank for forming a seal between the flange and the tank. The flange is aligned with the gasket and fastened to the tank so that the pipe stub passes through the hole and the flange compresses the gasket. A flexible coupling, e.g., of rubber or the like, is then disposed over the pipe stub of the sanitary-tee fitting and over the external pipe to interconnect the sanitary-tee fitting and the external pipe. One problem with this is that the flexible coupling allows the external pipe to move, e.g., due to shifting earth or the like. This causes the sanitary-tee fitting to deflect, which can cause the gasket to leak.

For the reasons stated above, and for other reasons stated below which will become apparent to those skilled in the art upon reading and understanding the present specification, there is a need in the art for alternatives for connecting piping within tanks to external piping.

SUMMARY

The above-mentioned problems with connecting piping within tanks to external piping and other problems are addressed by the present invention and will be understood by reading and studying the following specification.

For one embodiment, the invention provides a tank fitting that has a coupling. The coupling includes a flange disposed between a first end and a second end of the coupling. External threads are disposed between the flange and the first end. A gasket is disposed on the coupling between the flange and the first end of the coupling so as to abut the flange. The tank fitting also includes a nut that is threadably attachable to the external threads of the coupling.

Further embodiments of the invention include methods and apparatus of varying scope.

DETAILED DESCRIPTION

Figure 1:
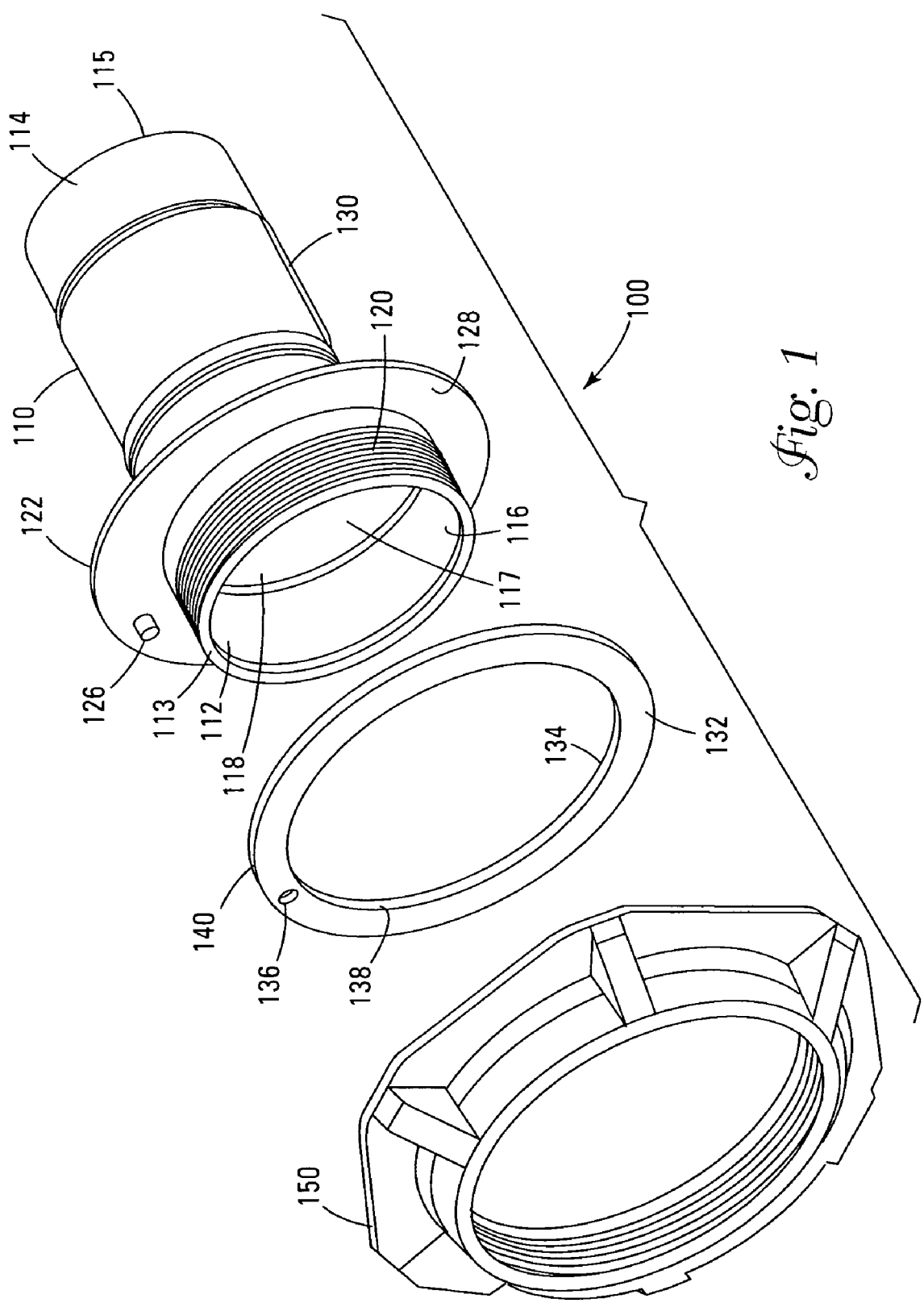
FIG. 1 is an exploded perspective view of a tank fitting according to an embodiment of the present invention.

In the following detailed description of the invention, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

Figure 2:
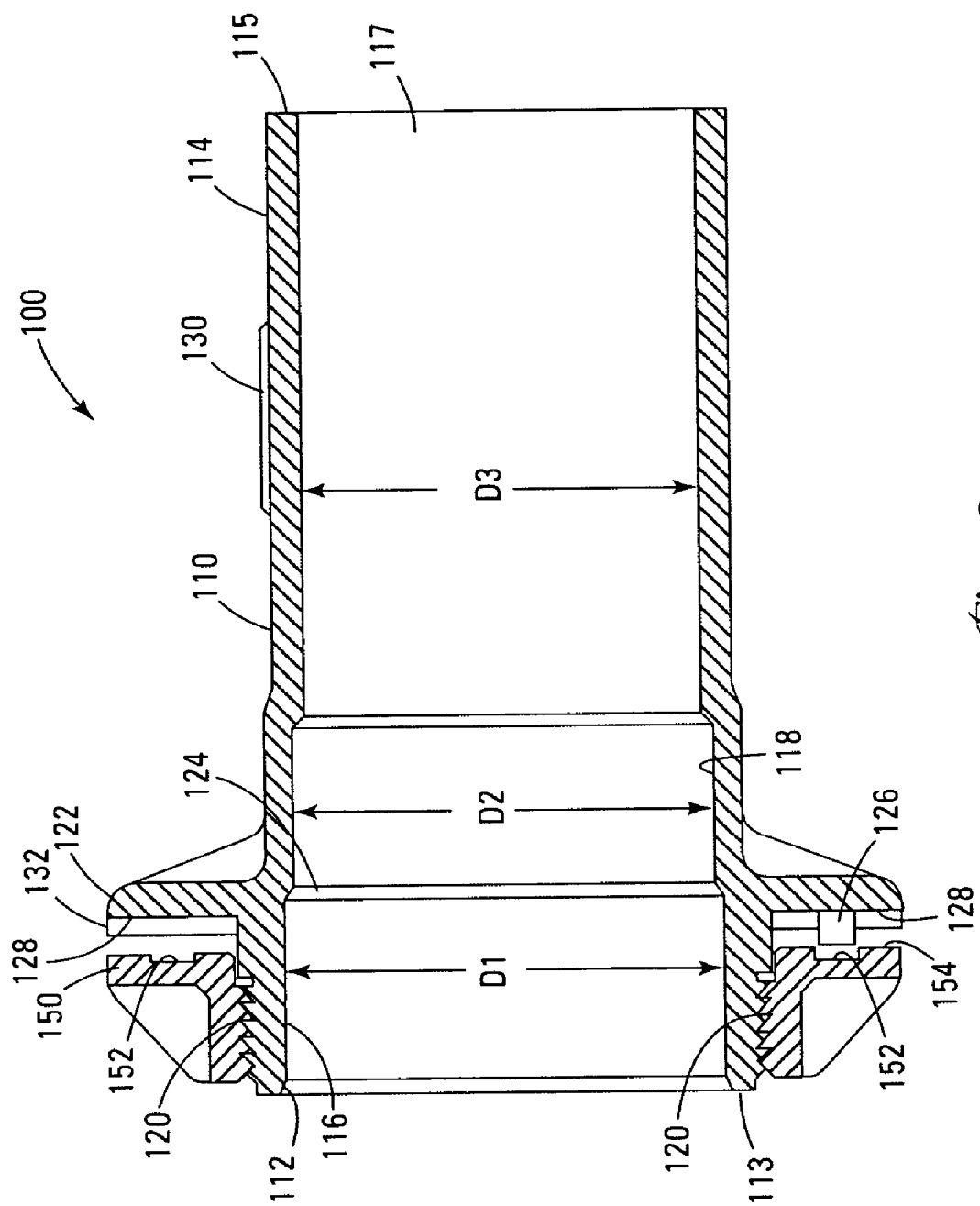
FIG. 2 is a cross-sectional view of the tank fitting of FIG. 1.

FIGS. 1 and 2 are respectively exploded and cross-sectional views of a tank-fitting 100, such as a septic tank fitting, according to an embodiment of the present invention. For one embodiment, tank-fitting 100 connects a pipe fitting, such as a sanitary-tee fitting, within a tank to an external pipe. Tank-fitting 100 includes a substantially rigid coupling 110, e.g., of polyvinylchloride (PVC). For one embodiment, coupling 110 is a male/female coupling having a female-end region 112 adjacent an end 113 of coupling 110 adapted to receive a pipe, such as the external pipe, therein and a male-end region 114 adjacent an end 115 of coupling 110 adapted to be received within the pipe fitting. For another embodiment coupling 110 has a stepped longitudinal internal bore 117 passing completely through ends 113 and 115 and having diameters D1, D2, and D3, as shown in FIG. 2. Coupling 110 is not limited to a male/female coupling. Rather, for other embodiments, coupling 110 is a male/male coupling (not shown) having male-end regions adjacent ends 113 and 115 or a female/female coupling (not shown) having female-end regions adjacent ends 113 and 115.

For another embodiment, the portion of internal bore 117 having the diameter D1 defines a socket 116 of female-end region 112, and for yet another embodiment, the portion of internal bore 117 having the diameter D2 defines a socket 118 of female-end region 112. The diameter D1 corresponds to the outer diameter of a first pipe that can be received in socket 116, and the diameter D2 corresponds to the outer diameter of a second pipe that can be received in socket 118. Therefore, tank-fitting 100 can be used with pipes of two different outer diameters. For one embodiment, the diameter D3 is the inner diameter of male-end region 114. For some embodiments, the diameter D3 corresponds to the inner diameter of a pipe.

External threads 120 are disposed on an exterior of coupling 110 at end region 112. For one embodiment external threads 120 are disposed on an exterior of socket 116, as shown in FIG. 2. Coupling 110 includes a single integral flange 122 disposed around an exterior of coupling 110 and between threads 120 and end region 114. For one embodiment, flange 120 is located at an interface 124 between sockets 116 and 118, as shown in FIG. 2. For another embodiment, a stud 126 protrudes from a face 128 of flange 122 substantially parallel to internal bore 117 in the direction of threads 120, as shown in FIG. 1. For some embodiments, a longitudinal alignment rib 130 is disposed on an exterior of coupling 110 between flange 122 and end region 114, as shown in FIGS. 1 and 2. For one embodiment, rib 130 is located at 180 degrees around coupling 110 from stud 126 and is substantially parallel to internal bore 117. The function of rib 130 is discussed below.

Tank-fitting 100 includes an annular gasket 132, e.g., of rubber or the like. For one embodiment, a hole 136 passes completely through gasket 132 and is located between an outer perimeter 140 of gasket 132 and a perimeter 138 of a hole 134 passing through the center of gasket 132 substantially parallel to hole 136. Gasket 132 is disposed around end region 112 so that gasket 132 butts against face 128 of flange 122, end region 112 extends through hole 134 of gasket 132, and stud 126 extends completely through hole 136 of gasket 132.

Tank-fitting 100 also includes a nut 150, e.g., of plastic, such as, PVC polypropylene, or the like, that threads onto threads 120 of coupling 110, as illustrated in FIG. 2. Nut 150 is threaded onto coupling 110 after passing end region 112 of coupling 110 through a hole in a tank for securing tank-fitting 100 to the tank. For one embodiment, an annular groove 152 is disposed in a face 154 of nut 150 so as to align with stud 126, as shown in FIG. 2. For another embodiment, stud 126 extends into annular groove 152 when nut 150 is threaded on coupling 110. For other embodiments, stud 126 extends only into a hole of a tank to which tank fitting 100 is attached.

Figure 3:
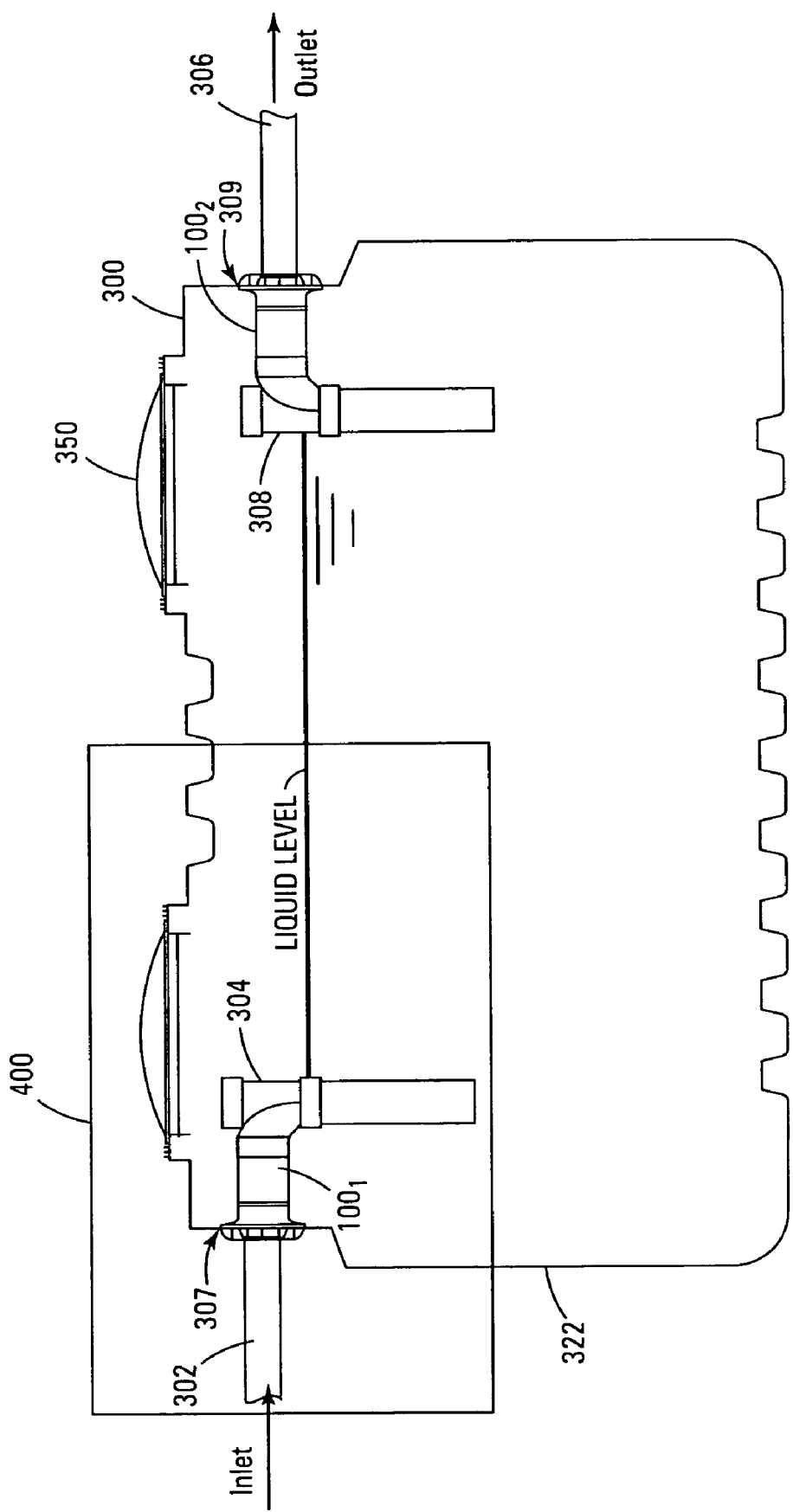
FIG. 3 illustrates a tank fittings installed on a tank according to another embodiment of the present invention.
Figure 4:
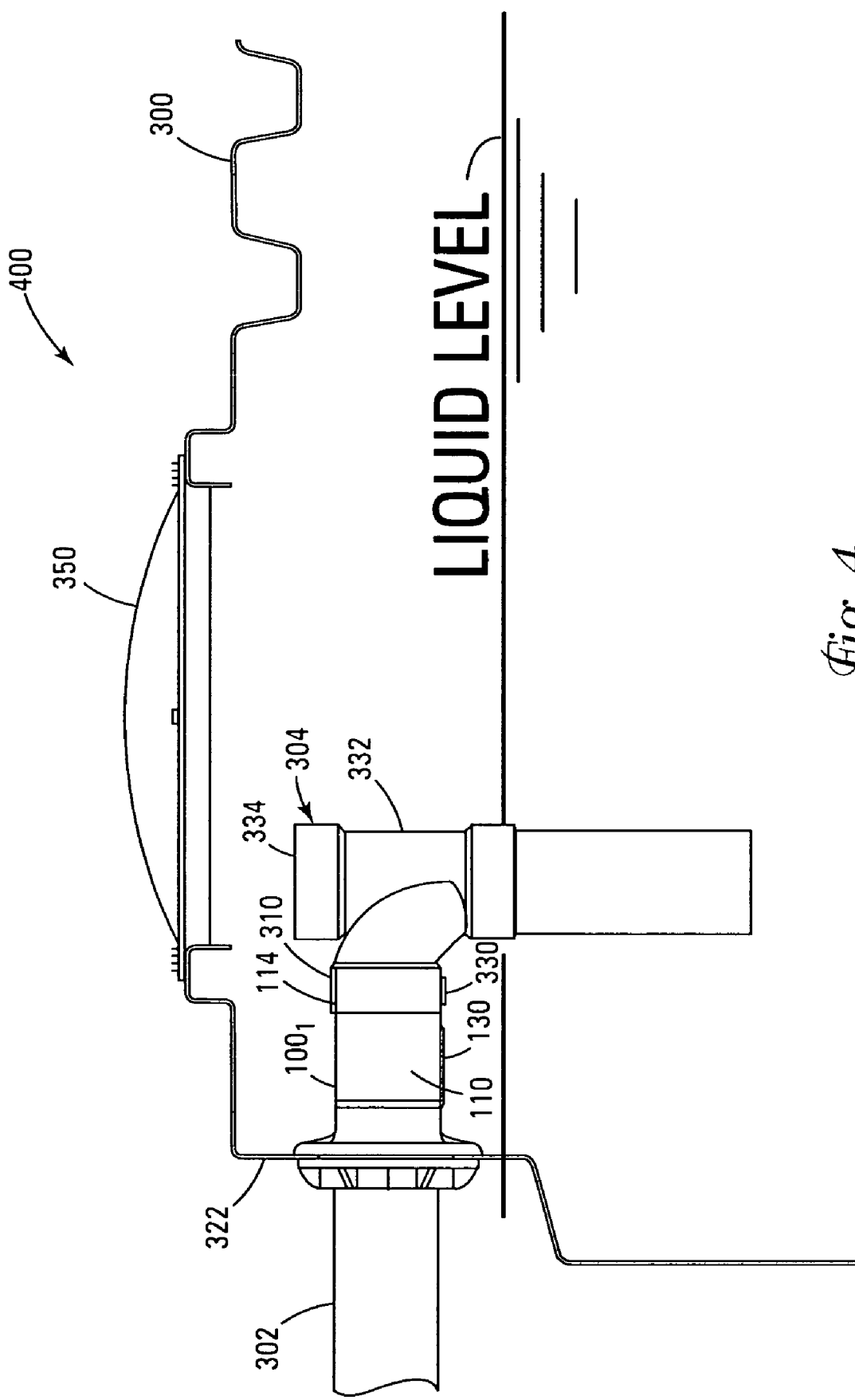
FIG. 4 is an enlarged view of region 400 of FIG. 3.
Figure 5:
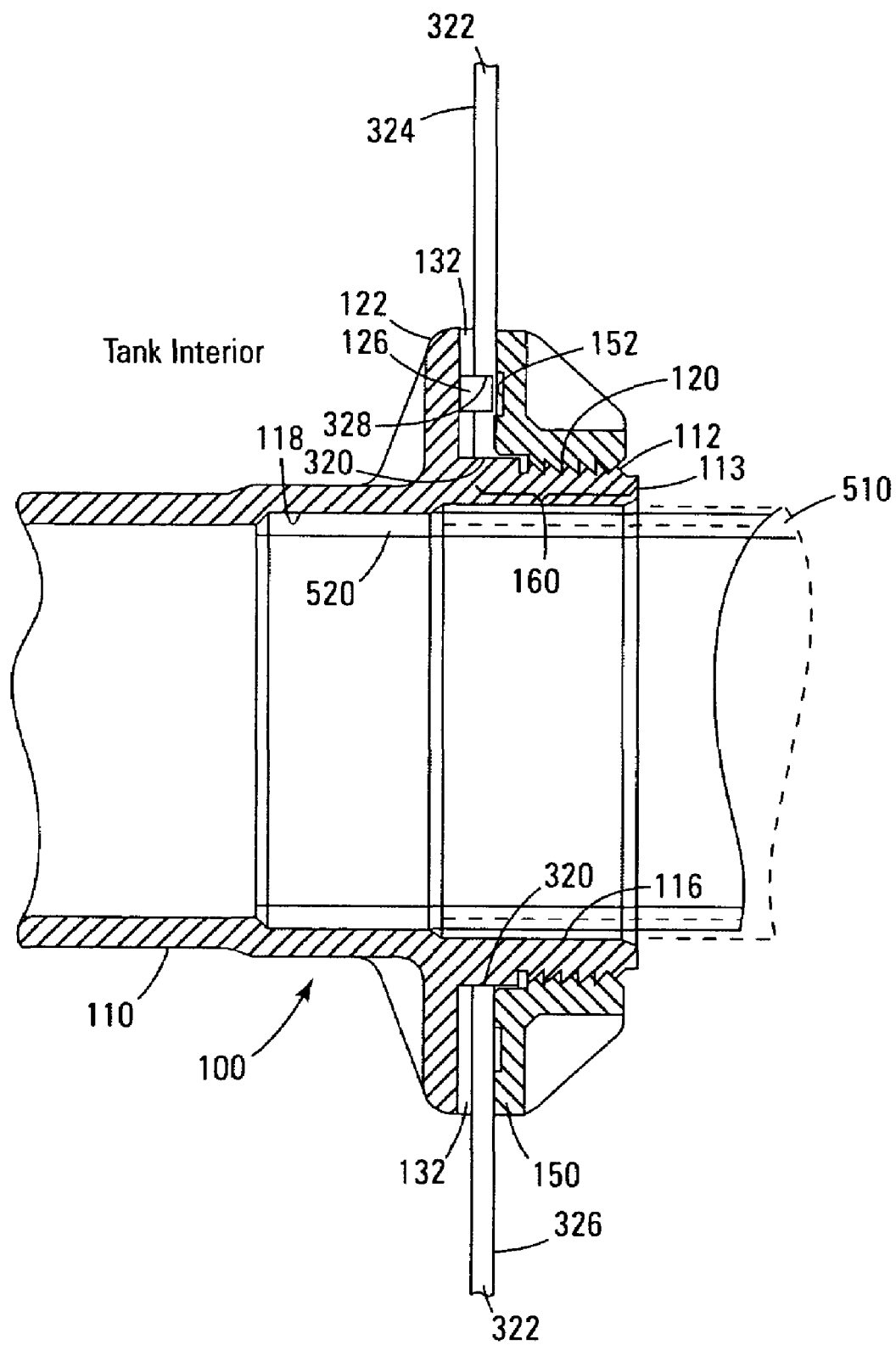
FIG. 5 illustrates a tank fitting in use according to another embodiment of the present invention.

FIGS. 3–5 illustrate tank-fitting 100 in operation according to another embodiment of the present invention. FIG. 3 illustrates tank-fittings $100_1$ and $100_2$ installed on a tank 300, such as a septic tank, water tank, industrial tank, agricultural tank, etc. For one embodiment, tank-fitting $100_1$ interconnects an external pipe 302 to a tee fitting 304, such as a sanitary-tee fitting, while tank-fitting $100_2$ interconnects an external pipe 306 to a tee fitting 308, such as a sanitary-tee fitting. For another embodiment, external pipes 302 and 306 are respectively inlet and outlet pipes for tank 300, and tank-fittings $100_1$ and $100_2$ are respectively disposed at an inlet 307 and an outlet 309 of tank 300. Tank fitting 100 is not limited to tee fittings. Rather, tank-fitting 100 can be used to connect any type of pipe fitting, such as an elbow, a coupling, etc., or pipe, disposed within a tank.

FIG. 4 is an enlarged view of a region 400 of FIG. 3. As shown in FIG. 4, end region 114 of coupling 110 of tank-fitting 100 is received in a socket 310 of tee fitting 304 and is bonded thereto, e.g., using a bonding agent formulated for plastic, such as PVC, polypropylene, or the like. Moreover, pipe 302 is received and bonded, e.g., using a bonding agent formulated for PVC, within socket 116 or 118 of coupling 110, depending on the outer diameter of pipe 302. In this way, coupling 110 substantially rigidly connects pipe 302 to tee fitting 304.

FIG. 5 illustrates that a portion 160 of end region 112 of tank-fitting 100, located between gasket 132 and end 113, passes completely through a hole 320 passing completely through a wall 322, e.g., a sidewall, of tank 300. Gasket 132 is sandwiched between an interior surface 324 of tank wall 322 and flange 122 for sealing around hole 320. Nut 150 is threaded on external threads 120 of coupling 110 so as to engage an exterior surface 326 of tank wall 322. This squeezes gasket 132 between flange 122 and the interior surface 324 of wall 322, as shown in FIG. 5, so that gasket 132 forms a liquid-tight seal around hole 320 between interior surface 324 and flange 122. Nut 150 secures tank-fitting 100 to tank 300 so that tank-fitting 100 is substantially immovable relative to tank 300. Meanwhile, coupling 10 of tank-fitting 100 provides a substantially rigid connection between an external pipe, such as pipe 302 or 306, and plumbing within tank 300, such as tee fitting 304 or 308. This acts to reduce the leakage problems associated with flexible connections.

For one embodiment, stud 126 passes through the hole 136 of gasket 132 and passes completely through a hole 328 passing completely through tank wall 322 substantially parallel to hole 320. Stud 126 may extend into annular groove 152 of nut 150, as shown in FIG. 5. For another embodiment, stud 126 slidably engages a sidewall of hole 328. Stud 126 acts to prevent tank-fitting 100 from rotating within hole 320 of tank 300 while threading nut 150 onto external threads 120 and during use. Note that nut 150 causes gasket 132 to form a liquid-tight seal around hole 328 between interior surface 324 and flange 122 in addition to causing gasket 150 to form a liquid-tight seal around hole 320. In another embodiment, hole 328 in tank wall 322 does not extend completely through tank wall 322, but rather is a blind hole that engages stud 126 when stud 126 is received therein.

As mentioned above, tank-fitting 100 can be used with pipes of two different outer diameters. This is illustrated in FIG. 5. A pipe 510, shown in dashed lines, can be received, seated, and bonded within socket 116 of tank-fitting 100, or a pipe 520 can be received, seated, and bonded within socket 118 of tank-fitting 100. The outer diameters of pipes 510 and 520 respectively correspond to the internal diameter D1 of socket 116 (shown in FIG. 2) and the internal diameter D2 of socket 118 (shown in FIG. 2).

For one embodiment, alignment rib 130 aligns with an alignment rib 330 disposed on an exterior surface of socket 310 of tee fitting 304, as shown in FIG. 4. This acts to ensure that a branch 332 of tee fitting 304 that is substantially perpendicular to socket 310 and tank-fitting 100 is substantially vertical, as shown in FIG. 4. The substantial vertical orientation of branch 332 enables branch 332 to be accessed through an end 334 of branch 332 that is substantially perpendicular to tank-fitting 100 via a removable cover 350 of tank 300.

CONCLUSION

Embodiments of the present invention provide tank fittings. For one embodiment, the invention provides a tank fitting that has a coupling, e.g., a male/female, male/male, or female/female coupling. The coupling includes a flange disposed between a first end and a second end of the coupling. External threads are disposed between the flange and the first end. A gasket is disposed on the coupling between the flange and the first end of the coupling so as to abut the flange. The tank fitting also includes a nut that is threadably attachable to the external threads of the coupling. For another embodiment, a stud protrudes from the flange and passes completely through the gasket.

In operation, for one embodiment, the tank fitting passes through a first hole in a tank. The nut secures the tank fitting to the tank so that the tank fitting is substantially immovable relative to the tank. The nut also squeezes the gasket between the flange and an interior surface of the tank so that the gasket forms a liquid-tight seal around the first hole in the tank between the tank and the flange. The coupling substantially rigidly interconnects an external pipe and plumbing within the tank. This acts to reduce the leakage problems associated with flexible connections. For another embodiment, a stud protrudes from the flange and passes through the gasket and a second hole in the tank that is substantially parallel to the first hole. This acts to prevent the tank fitting from turning within the first hole. The gasket forms a liquid-tight seal around the second hole between the tank and the flange.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A tank fitting comprising:
    a longitudinal stepped internal bore passing through first and second ends of the tank fitting, the internal bore having first and second diameters respectively defining first and second sockets of a female-end region of the tank fitting adjacent the first end, the internal bore further having a third diameter that forms an internal diameter of a male-end region of the tank fitting adjacent the second end, the male-end region adapted to be received within a fitting or a pipe for bonding thereto;
    a flange disposed between the first and second ends;
    external threads disposed between the flange and the first end;
    a gasket disposed between the flange and the first end so as to abut the flange;
    a stud protruding from a face of the flange toward the first end and passing completely through the gasket; and
    a nut threadably attachable to the external threads, the nut comprising an annular groove into which the stud extends when the nut is threadably attached to the external threads.

2. The tank fitting of claim 1, and further comprising an alignment rib disposed on an exterior of tank fitting between the flange and the second end.

3. The tank fitting of claim 2, wherein the alignment rib is located 180 degrees around the tank fitting from the stud.

* * * * *